United States Patent [19]

Chen et al.

[11] Patent Number: 4,786,564

[45] Date of Patent: Nov. 22, 1988

[54] METHOD FOR MANUFACTURING A MAGNETIC DISK HAVING REDUCED BIT SHIFT, MINIMIZED NOISE, INCREASED RESOLUTION AND UNIFORM MAGNETIC CHARACTERISTICS, AND THE RESULTING DISK

[75] Inventors: Tu Chen, Saratoga; Tsutomu T. Yamashita, San Jose, both of Calif.

[73] Assignee: Komag, Inc., Milpitas, Calif.

[21] Appl. No.: 18,650

[22] Filed: Feb. 25, 1987

[51] Int. Cl.$^4$ .............................................. H01F 10/30
[52] U.S. Cl. .................................. 428/694; 204/192.2; 427/129; 427/131; 428/678; 428/680; 428/900; 428/928
[58] Field of Search ............... 428/694, 900, 928, 678, 428/680; 427/129, 131; 204/192, 4, 192.2

[56] References Cited

U.S. PATENT DOCUMENTS

| 3,832,168 | 8/1974 | Gulla | 428/900 |
| 4,224,381 | 9/1980 | Patel et al. | 427/130 |
| 4,514,451 | 4/1985 | Suzuki et al. | 428/141 |
| 4,552,820 | 11/1985 | Lin et al. | 428/611 |
| 4,610,911 | 9/1986 | Opfer et al. | 428/900 |
| 4,629,660 | 12/1986 | Sagoi et al. | 427/131 |

FOREIGN PATENT DOCUMENTS

| 18029 | 1/1982 | Japan . |
| 171694 | 4/1984 | Japan . |
| 88806 | 5/1984 | Japan . |
| 142738 | 8/1984 | Japan . |
| 217224 | 12/1984 | Japan . |
| 196010 | 9/1985 | Japan . |
| 193140 | 9/1985 | Japan . |
| 267922 | 11/1986 | Japan . |

OTHER PUBLICATIONS

Wolf et al., "The Influence of Ni(P) Underlayers on Magnetic Properties of Electrodeposited Permalloy Films", IEEE Transactions on Magnetics, Sep. 1969, p. 515.

Howard, "Thin Films for Magnetic Recording Technology: A Review", Journal of Vacuum Science & Technology, Jan. 1985, pp. 1-13.

Potter, "Anaysis of Saturation Magnetic Recording Based on Arctangent Magnetization Transitions", Journal of Applied Physics, vol. 41, No. 4, Mar. 15, 1970, pp. 1647-1651.

Opfer et al., "Thin-Film Memory Disc Development", Hewlett-Packard Journal, Nov. 1985, pp. 4-10.

Chen, "The Micromagnetic Properties of High-Coercivity Metallic Thin Films and their Effects on the Limit of Packing Density in Digital Recording", IEEE Transactions on Magnetics, vol. MAG-17, No. 2, Mar. 1981, pp. 1181-1191.

Daval et al., "Electron Microscopy on High-Coercive-Force Co-Cr Composite Films", IEEE Transactions on Magnetics, vol. MAG-6, No. 4, Dec. 1970, pp. 768-773.

(List continued on next page.)

Primary Examiner—George F. Lesmes
Assistant Examiner—William M. Atkinson
Attorney, Agent, or Firm—Kenneth E. Leeds; Alan H. MacPherson; Paul J. Winters

[57] ABSTRACT

A method for manufacturing a disk includes the step of forming a first nickel-phosphorus alloy layer on an aluminum substrate, e.g., by electroless plating. A second nickel-phosphorus layer is then sputtered onto the first nickel-phosphorus layer, and a magnetic alloy is sputtered onto the second nickel-phosphorus layer. The magnetic alloy is typically sputtered immediately after the second nickel-phosphorus layer is formed without removing the disk from the sputtering apparatus between the time the second nickel-phosphorus layer is formed and the time the magnetic alloy is formed. Because of this, contaminants are not capable of lodging on or affecting the surface of the disk prior to formation of the magnetic alloy. The second nickel-phosphorus layer is typically amorphous and therefore masks any nonuniformities in the surface of the first nickel-phosphorus layer. Because of this, the second nickel-phosphorus layer serves as a uniform nucleation surface for forming the magnetic alloy, and thus the magnetic alloy exhibits uniform magnetic characteristics.

27 Claims, 5 Drawing Sheets

OTHER PUBLICATIONS

Dressler et al., "A Study of Digitally Recorded Transitions in Thin Magnetic Films", IEEE Transactions on Magnetics, vol. MAG-10, 1974, pp. 674–677.

Curland et al., "Transition Region in Recorded Magnetization Patterns", Journal of Applied Physics, vol. 41, No. 3, Mar. 1, 1979, pp. 1099–1101.

Bonyhard et al., "A Theory of Digital Magnetic Recording on Metallic Films", IEEE Transactions of Magnetics, vol. MAG-2, No. 1, Mar. 1966, pp. 1–5.

Chen et al., "High Coercivity and High Hysteresis Loop Squareness of Sputtered Co-Re Thin Film", Journal of Applied Physics 50(6), Jun. 1979, pp. 4285–4291.

Weidner et al., "Elementary Modern Physics", pp. 145–150, published by Allyn and Bacon, Inc., 1973.

Fisher et al., "Magnetic Properties and Longitudinal Recording Performance of Corrosion-Resistant Alloy Films" IEEE Trans. on Magnetics, vol. MAG-22, No. 5, Sep. 1986, pp. 352–354.

Yamada et al., "CoNiCr/Cr Sputtered Thin Film Disks", IEEE Trans. on Magnetics, vol. MAG-21, No. 5, Sep., 1985, pp. 1429–1431.

Abe et al., "Orientation Controlled Sputtered CoNi/Cr Recording Rigid Disk", IEEE Transactions on Magnetics, vol. MAG-22, No. 5, Sep. 1986, pp. 570–572.

Teng, "Anisotropy Induced Signal Wafeform Modulation of DC Magnetron Sputtered Thin Film Disks", IEEE Trans. on Magnetics, vol. MAG-22, Sep. 1986, pp. 579–581.

Yamaguchi et al., "Magnetic Properties and Structures of Sputtered CoNi/Cr Films", IEEE Trans. on Magnetics, vol. MAG-22, No. 5, Sep. 1986, pp. 576–578.

Ishikawa et al., "Film Structure and Magnetic Properties of CoNiCr/Cr Sputtered Thin Film", IEEE Trans. on Magnetics, vol. MAG-22, No. 5, Sep. 1986, pp. 573–575.

Tanaka et al., "Noise Characteristics in Plated Co-Ni-P Film for High Density Recording Medium", Journal of Applied Physics 53(3), Mar. 1982, pp. 2576–2578.

Suganuma et al., "Production Process and High Density Recording Characteristics of Plated Disks(Invited)", IEEE Trans. on Magnetics, vol. MAG-18, No. 6, Nov. 1982, pp. 1215–1220.

Uchinami et al., "Magnetic Anisotropic Sputtered Thin Film Disks", Intermag. Conf. Digests, 1987, p. GA-03.

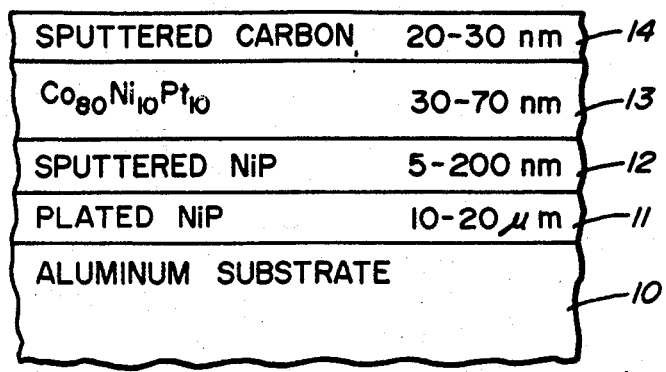
FIG._1.
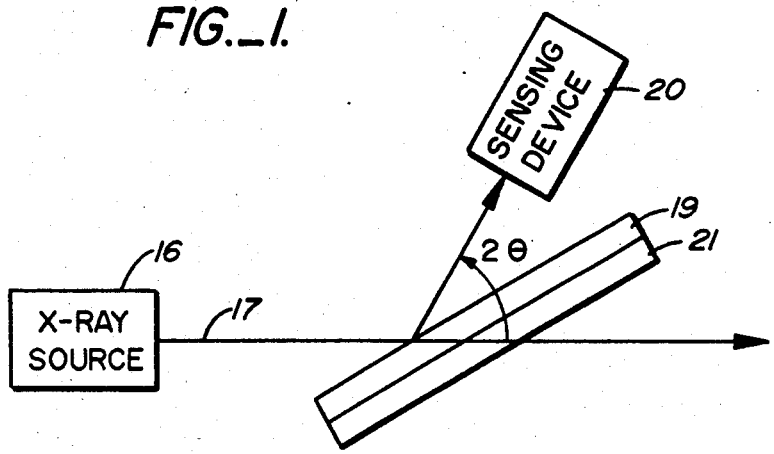
FIG._2b.
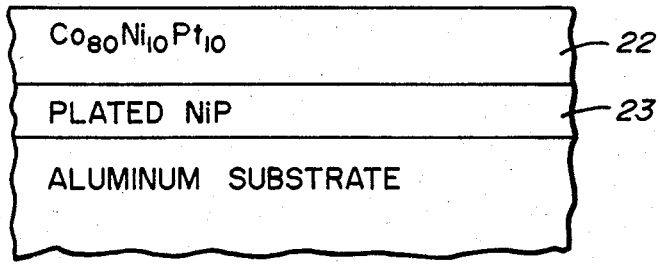
FIG._3b.
(PRIOR ART)

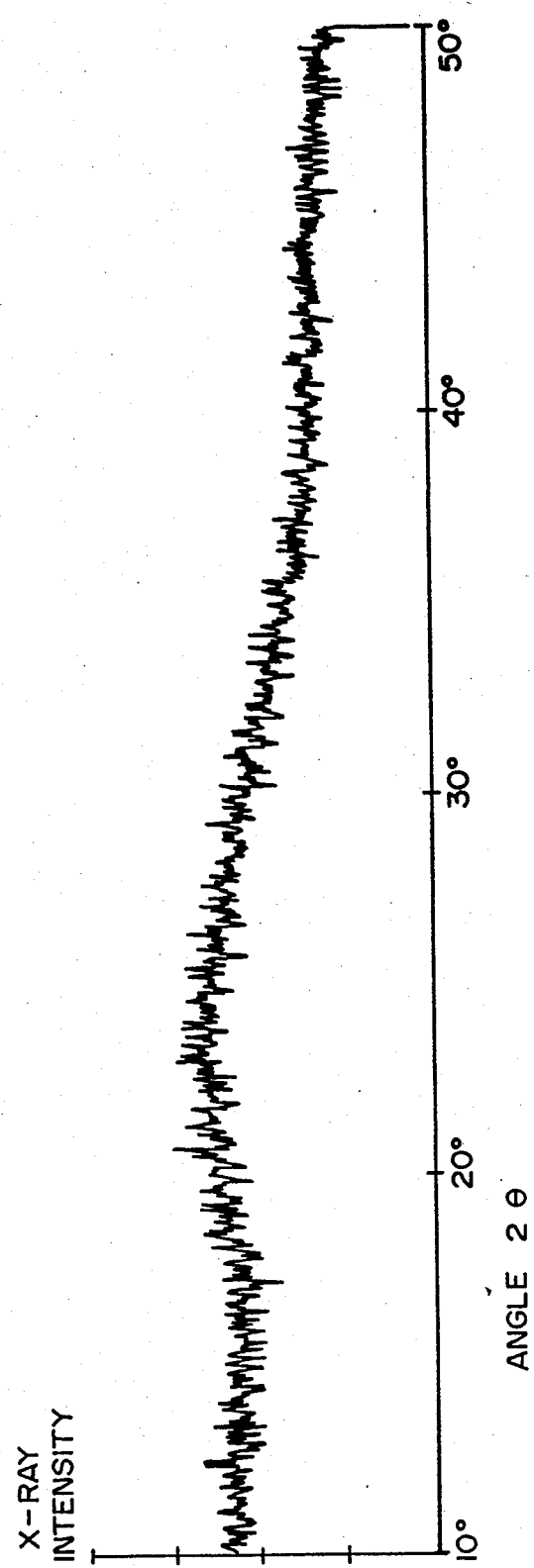
FIG._2a.

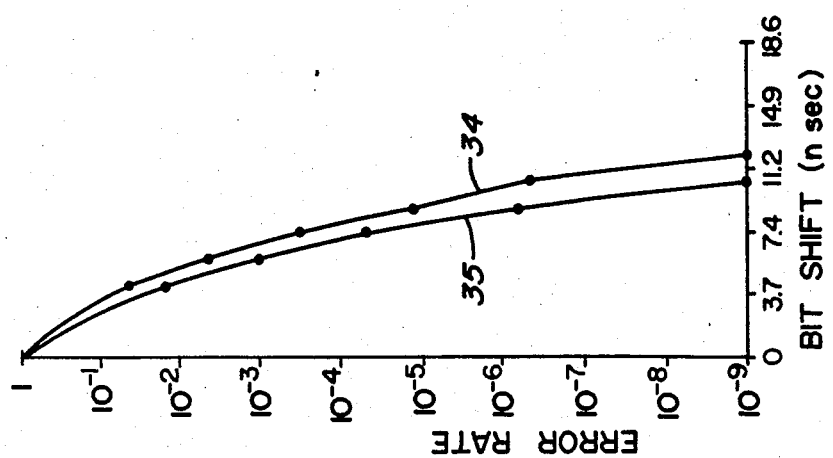
FIG._5.
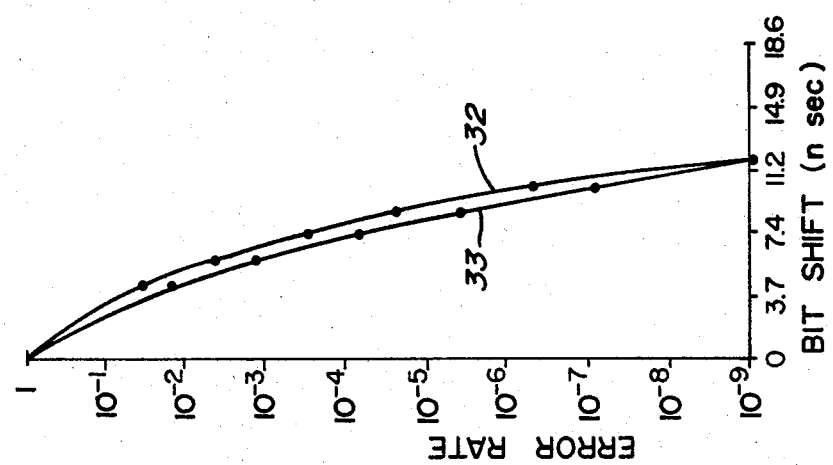
FIG._4.
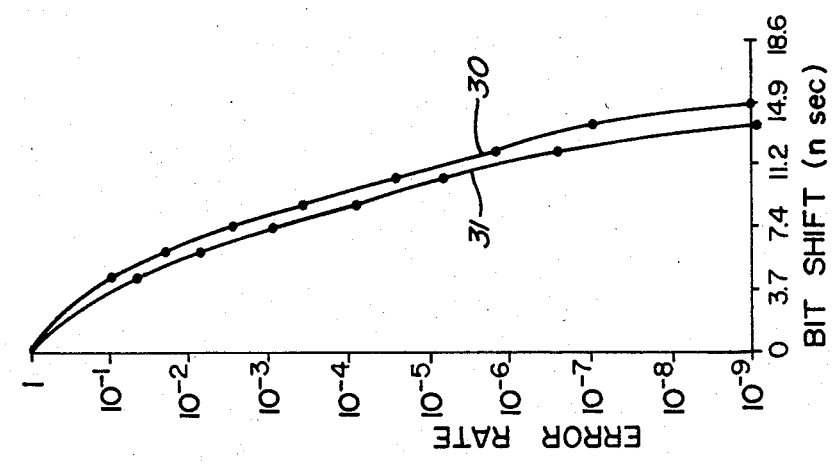
FIG._3a.

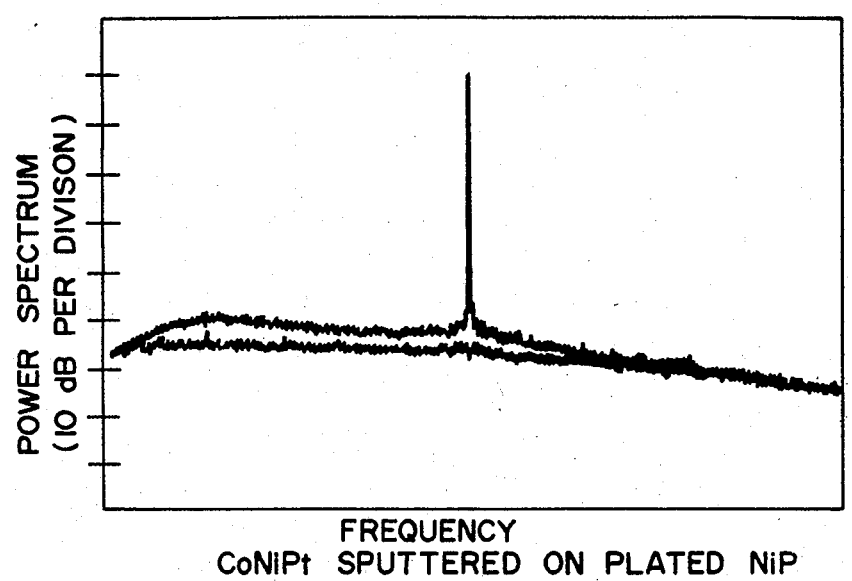
FIG._6a.
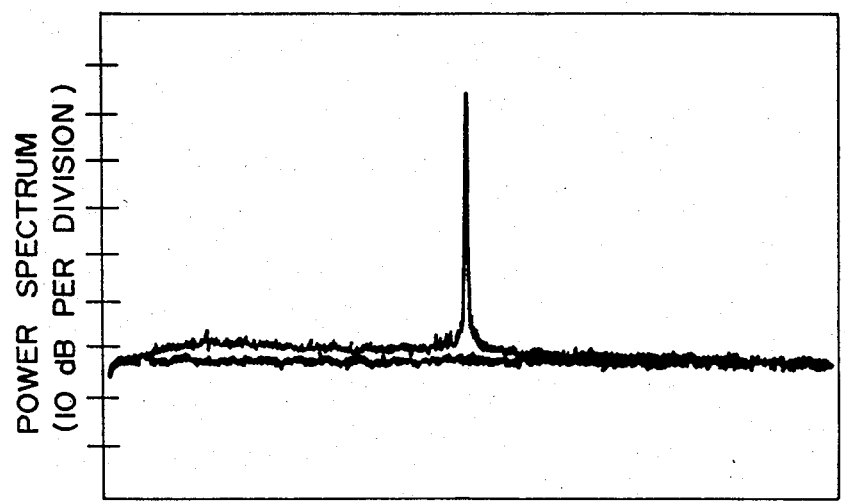
FIG._6b.

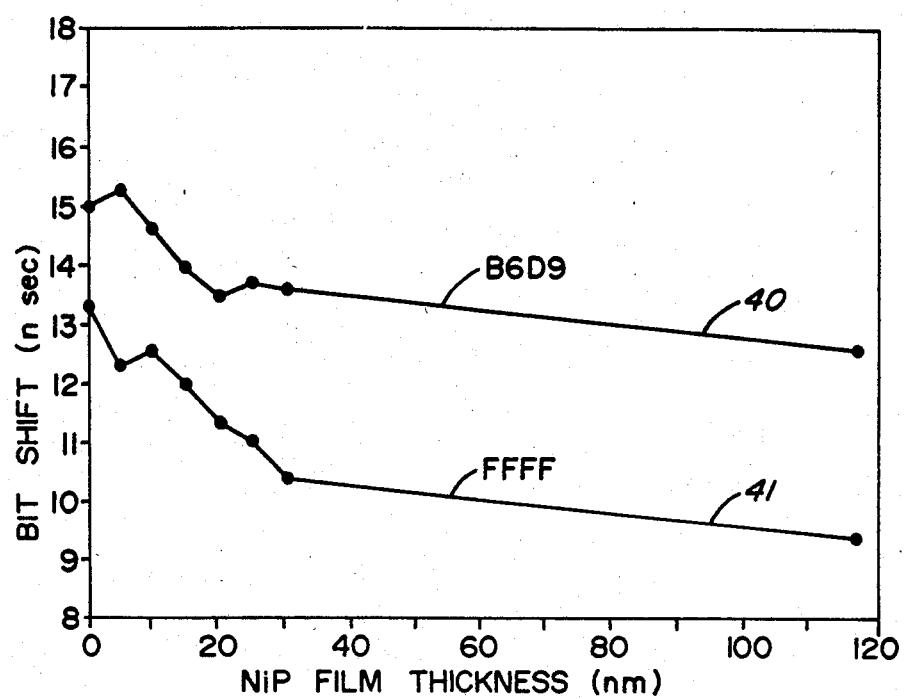
FIG._7.
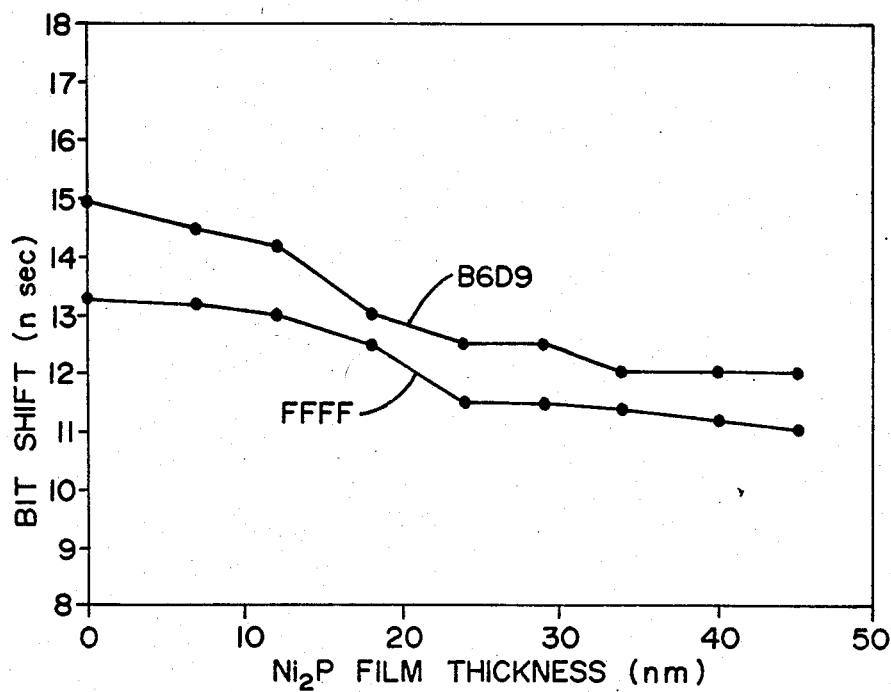
FIG._8.

METHOD FOR MANUFACTURING A MAGNETIC DISK HAVING REDUCED BIT SHIFT, MINIMIZED NOISE, INCREASED RESOLUTION AND UNIFORM MAGNETIC CHARACTERISTICS, AND THE RESULTING DISK

BACKGROUND OF THE INVENTION

1. Field of the Invention

This invention relates to metallic thin film magnetic recording media and methods for forming metallic thin film magnetic recording media.

2. Description of the Prior Art

It is well known in the art of magnetic recording that magnetic disks using magnetic metallic thin film media exhibit a higher recording density than disks utilizing conventional iron oxide or other metallic particles suspended in a binder. This is because metallic magnetic thin films can be made to have a much higher saturation magnetic moment (and hence a higher magnetic remanent) and can be made much thinner than the binder type media. Typical films of magnetic media include cobalt alloys such as Co-Ni, Co-Ni-Cr, Co-Pt, Co-Ni-Pt, Co-Sm, and Co-Re formed by vacuum deposition.

In order for the magnetic media to be able to support a high linear recording density, it is necessary to minimize the film thickness (e.g., below 1000Å), and the magnetic coercivity $H_c$ must be high enough to sustain a high density of flux reversals per linear inch. For example, to sustain a packing density of ten thousand to several tens of thousands of flux reversals per inch, the coercivity should be between 600 and 2000 Oersteds. Furthermore, if the media is to be used in high density recording, the media should be capable of providing a strong output signal during the read-back process under high packing density conditions.

In order for the media to provide a strong output signal during read-back, the media should have an intrinsically high saturation magnetization $M_s$, e.g., greater than 400 electromagnetic units per cubic centimeter (emu/cc) and preferably greater than 800 emu/cc. The media should also have a high hysteresis loop squareness S ($S=M_r/M_s$), e.g., at least 80% to provide a high magnetic remanent $M_r$. The strength of the magnetic field received by the disk reading head (or read/write head in the case of a single inductive head used for both writing and reading) is proportional to the film thickness T times magnetic remanent $M_r$. $M_rT$ should generally be greater than approximately $2 \times 10^{-3}$ emu/cm$^2$ to provide a sufficiently strong signal for a practical disk drive.

The above-described magnetic parameters are discussed in greater detail in an article entitled "Thin Film for Magnetic Recording Technology: A Review" by J. K. Howard, published in the *Journal of Vacuum Science and Technology* in January, 1985, incorporated herein by reference.

In magnetic recording, data is stored or recorded in the magnetic media by forming a sequence of small cells of oppositely polarized magnetized regions. The size of the regions is determined by the width of the inductive writing head and is typically on the order of one micron long and over ten microns wide. A "bit" of stored information is represented by a transition between two oppositely polarized magnetized regions. The transition between two oppositely magnetized regions has a certain characteristic physical length due to the demagnetization effect that occurs in the transition region as the result of the two opposite magnetic dipoles being present. This characteristic length of the transition region is generally called the transition length L and the minimum transition length $L_{min}$ can be related to the media parameters in the case of saturation recording based on an arctangent transition model as described in "Analysis of Saturation Magnetic Recording Based on Arctangent Magnetization Transition" by R. I. Potter in *J. Appl. Phys.*, Vol. 41, pages 1647-1651, 1970, or "A Theory of Digital Magnetic Recording on Metallic Films" by P. I. Bonyhard, et al., published in *IEEE Trans Magn.*, Vol. MAG-2, pages 1-5, 1966, incorporated herein by reference. This model can be summarized as follows:

$$L_{min} \approx 2\pi M_r T/H_c \qquad (1)$$

where $M_r$ is the remanent magnetization, T is the magnetic film thickness, and $H_c$ is the coercivity of the magnetic film. This equation was derived based on a macromagnetic theory and gives a relationship between the characteristic transition length L and the media parameters. Media having a small characteristic transition length L is capable of an increased linear packing density due to reduction in bit crowding by adjacent bits.

It should be noted that even though equation 1 qualitatively predicts the dependence of transition length L (and, hence, the packing density) on media thickness, remanent and coercivity of media, it does not do so quantitatively for thin metallic film media. This is due to the fact that equation 1 was derived based on macromagnetic considerations without taking into consideration the state of complex micromagnetic domains which exist in the transition region.

Many papers examining micromagnetic structures report that the transition region in the metallic thin film media has a "sawtooth-like" jagged boundary micromagnetic structure rather than the "domain-wall-like" smooth boundary used in the theoretical computation of the equation 1. (See, for example, "Transition Region in Recorded Magnetization Pattern," by Curland, et al., published in *J. Appl. Phys.*, Vol. 41, pages 1099-1101, 1970; "Electron Microscopy on High Coercive Force Co-Cr Composite Film," by Daval, et al., published in *IEEE Trans. Magn.*, Vol. MAG-6, pages 708-773, 1970, and "A Study of Digitally Recorded Transition in Thin Magnetic Film," by Dressler, et al., published in *IEEE Trans. Magn.*, Vol. MAG-10, pages 674-677, 1974, incorporated herein by reference.) The origin of the jagged "sawtooth-like" transition is associated with the formation of magnetic clusters that are caused by strong interparticle interaction of the magnetic crystalline particles, as reported by Chen et al. in "High Coercivity and High Hysteresis Loop Squareness of Sputtered Co-Re Thin Film," *J. Appl. Phys.*, Vol. 50, pages 4285-4290, 1979, incorporated herein by reference. (As used herein, the term "magnetic cluster" is a portion of the media consisting of many grains having a nearly constant magnetization direction.) These magnetic clusters cause the formation of complex vortex-like domain structures in the transition region and, hence, the "sawtooth-like" boundary appearance, as reported by Chen in "The Micromagnetic Properties of High-Coercivity Metallic Thin Films and Their Effects on the Limit of Packing Density in Digital Recording," *IEEE Trans. Magn.*, Vol. MAG-17, pages 1181-1191, 1981, incorporated herein by reference.

The formation of the vortex micromagnetic domain structure in the transition region and "sawtooth-like" ragged structure in the boundary of the transition region not only increases the transition length (and, hence, reduces the capability of supporting a high packing density), but also causes excessive media noise and bit shift. (Bit shift occurs when a transition region between magnetized cells is displaced from a desired position. If the transition region is displaced by too great a distance, data on the disk may be misread.) To reduce the media noise, bit shift, and transition region length caused by the jagged transition region, it is necessary to develop a disk manufacturing process to produce media which minimizes the size of the jagged transition region. To achieve this goal, it is necessary to control the crystal growth and morphology of the microstructure of the magnetic crystalline material during the disk manufacturing process.

Another factor which may degrade media performance by causing excessive noise and bit shift is the formation of small abnormal regions having magnetic properties different from those of other portions of the disk surface. As previously mentioned, data stored in magnetic disks is typically recorded in a sequence of small cells (or magnetized regions) which are typically on the order of one micron long and ten microns wide. A typical high performance $5\frac{1}{4}''$ diameter rigid disk using thin metallic film media stores more than $10^8$ bits on each surface of the disk. If the magnetic film includes an abnormal region having a size on the order of the above-mentioned cell size (i.e., where the magnetic properties of the abnormal region are different from the magnetic properties of the rest of the film), then the recording characteristics in the abnormal region will be different from the recording characteristics of the rest of the disk surface. Such abnormal regions lead to poor disk performance.

As an example, if the coercivity $H_c$ and hysteresis loop squareness S in an abnormal region of the disk are significantly different from the coercivity and squareness in the surrounding area of the disk, the state of magnetization and the position of the transition region of each cell in that abnormal region may be different from those in the surrounding normal area even under constant writing waveform conditions. This can be particularly true at or near the junction between the normal and abnormal areas where the transition between cells may be shifted away from a desired position due to the difference in the coercivity $H_c$ between the normal and abnormal regions. Consequently, the bit stored in the abnormal area will exhibit excessive bit shift and result in a reduced signal detection window margin. (The signal detection window is a time window during which a transition must be detected in order for data to be read properly. The signal detection window margin is the amount of time between the detection of a transition region and the edge of the signal detection window.) Furthermore, the signal-to-noise (S/N) ratio, resolution and overwrite characteristics in the abnormal region will be different from those of the surrounding area.

A typical example of how an abnormal region can cause noise in a read-back operation occurs when the coercivity $H_c$ in the abnormal region of the disk is significantly higher than the average coercivity across the disk surface. In this case, the magnetization in the cell may not be saturated by the writing head and, hence, the output signal amplitude from the reading head during the read-back process in the abnormal area would be lower than the output signal provided by the rest of the disk. In addition, the overwrite of the high $H_c$ abnormal region may be poorer and consequently the S/N ratio from the abnormal region would be lower than the S/N ratio for the rest of the disk. Conversely, if the coercivity in the abnormal region is lower than the average disk coercivity, then the resolution exhibited by the media at the abnormal region would suffer.

In typical commercial disk drives, the read/write head is optimized for a specific coercivity and such disk drives cannot tolerate deviation in coercivity of more than plus or minus 50 Oe. A deviation of coercivity beyond the prescribed limits usually manifests itself as a phase margin error (i.e., a soft error) which is caused by a shift in the disk output signal pulse (indicative of a transition region) outside of the signal detection window.

If the hysteresis loop squareness S changes locally, the magnetic remanent $M_r$ (which is proportional to the amplitude of the output signal) changes as well, leading to signal modulation. If the remanent at the abnormal region is lower than the average disk remanent due to poor hysteresis squareness, the output signal amplitude provided by the abnormal region may be too low. It is therefore necessary to ensure that there are no regions on the disk larger than a few square microns having magnetic characteristics which greatly differ from the magnetic characteristics which of the disk.

The magnetic properties of thin film media are closely related to the film microstructure (e.g., to parameters such as grain size, crystal phase, amount of grain separation and grain orientation). It is generally accepted that control of the nucleation process is often the key factor in determining the ultimate structure of a vacuum deposited magnetic film. In turn, the composition, crystalline structure, and morphology of the substrate surface upon which the film is formed are key factors for controlling the nucleation process. Thus, magnetic films formed under identical process conditions can have entirely different microstructures, and thus different magnetic properties, depending upon the surface condition of the substrates on which the films are formed.

The surface characteristics of substrates used to form magnetic disks can be affected by a number of factors. For example, a substrate surface may be contaminated by absorbing or reacting with disk cleaning agents or water during substrate cleaning or ambient gaseous elements during the substrate drying process. Such contamination can affect the crystal structure of the magnttic film deposited on the substrate and thus affect the film magnetic characteristics.

Furthermore, substrate surfaces are typically polished and textured prior to magnetic film deposition to provide aerodynamic characteristics which enable the read/write head to fly. Such polishing and texturing can induce strain and change composition on a microscopic scale and hence affect magnetic film crystal growth. If the contaminants and surface strain are not distributed uniformly over the entire disk surface or the substrate composition varies over the disk surface, the resulting film will exhibit nonuniform magnetic properties and will include regions having abnormal magnetic characteristics.

Another factor which can cause the magnetic film to exhibit nonuniform magnetic characteristics is nonuniformity of the crystal structure or morphology of the underlying substrate in the case of crystalline substrates.

There are two methods currently used to alleviate nonuniformities in disk substrates. One method is to sputter-etch or plasma-etch the substrate just prior to magnetic filme deposition. During such processes, a portion of the substrate surface is removed. Unfortunately, the above described etching techniques are difficult to implement because they require application of a negative voltage to the substrate, and it is difficult to apply the negative voltage uniformly across the substrate surface.

The second method for alleviating the effects of nonuniformities in the substrate surface is to sputter a thick chromium layer onto the substrate just prior to forming the magnetic film. Such processes are typically used in conjunction with magnetic films comprising Co-Ni or Co-Ni-Cr alloys. In such processes, the primary purpose of the chromium layer is not to mask nonuniformities in the substrate surface, but rather to control and increase the coercivity of the Co-Ni or Co-Ni-Cr alloy. (See, for example, "Thin Film Memory Disc Development" by Opfer, et al., published in the *Hewlett Packard Journal,* in November, 1985, incorporated herein by reference.) However, as a secondary effect, the chromium does partially mask nonuniformities in the substrate surface. The chromium layer comprises crystalline grains which are influenced by the substrate surface morphology. Thus, the chromium crystal structure can be significantly affected by substrate surface condtions and can, in turn, transmit the substrate surface conditions to the magnetic film. Thus, even when using a chromium layer between the substrate and magnetic media, nonuniformities in the substrate surface can still create nonuniformities in the magnetic properties of the media.

In summary, magnetic recording media using metallic magnetic thin film can provide higher linear packing densities. However, due to nonuniformities in the substrate surface, small abnormal areas exhibiting abnormal magnetic properties may be created. As a result, excessive bit shift and media noise can occur and degrade the media performance for high density recording. In addition, although the theoretical transition length of the thin film media may be small in comparison to the binder type media, "sawtooth-like" jagged transition regions cause excessive bit shift and media noise during high density recording. These jagged transition regions also limit the recording density achievable with thin metallic magnetic films.

To overcome these problems, it is desirable to create a metallic magnetic film having a uniform crystalline structure across the whole surface of the disk and the structure and morphology of the crystalline structure should be tailored to reduce the jagged transitions.

SUMMARY

A process in accordance with our invention includes the step of sputtering a thin amorphous or near amorphous film of material on a substrate surface just prior to deposition of magnetic thin film media to control the nucleation and growth of the crystalline structure of the magnetic media and also to prevent nonuniformities in the substrate surface from affecting the magnetic characteristics of the media. The thin film typically comprises a nickel-phosphorus alloy. (As used herein, the term "nickel-phosphorus" encompasses alloys including nickel and phosphorus in any ratio.) The nickel-phosphorus film is typically sputtered from a sputtering target of a nickel-phosphorus alloy which may be formed from electroless plating of a nickel-phosphorus solution. The sputtering target may also be formed by sintering various nickel-phosphorus compounds such as $Ni_2P$, $Ni_5P_2$, and $Ni_3P_2$, so that the target includes a desired percentage of phosphorus. The phosphorus content in the sputtered nickel-phosphorus film should be in the range of 5 to 30 weight percent and, preferably be in the range of 10 to 20 weight percent.

The sputtered nickel-phosphorus layer is nearly amorphous and the film thickness is great enough (e.g. between 5 and 200 nm) to prevent nonuniformities in the underlying substrate surface from being transmitted to the magnetic layer. Furthermore, the sputtered nickel-phosphorus provides a reproducible and consistent surface on which the magnetic media nucleates and grows. Thus, this nickel-phosphorus undercoat ensures the formation of a desired microstructure and morphology in the crystalline structure of the magnetic media. This results in formation of magnetic film having superior magnetic recording characteristics and exhibiting low bit shift, high resolution and low noise, and superior uniformity of magnetic properties over the entire surface of the disk.

BRIEF DESCRIPTION OF DRAWINGS

FIG. 1 illustrates in cross section a magnetic disk including a sputtered nickel-phosphorus alloy underlayer formed in accordance with our invention.

FIG. 2a illustrates an X-ray diffraction pattern provided by a 200 nm thick nickel-phosphorus alloy layer sputtered on a glass substrate the Y axis in FIG. 2a is in arbitrary units.

FIG. 2b illustrates the apparatus used to generate the diffraction pattern illustrated in FIG. 2a.

FIG. 3a is a bit shift plot of a prior art Co-Ni-Pt alloy magnetic film without a sputtered nickel-phosphorus undercoat.

FIG. 3b illustrates in cross section the magnetic disk used to form the bit shift curve of FIG. 3a.

FIG. 4 is a bit shift plot of a Co-Ni-Pt alloy magnetic film formed on a sputtered nickel-phosphorus underlayer which was sputtered from an electroless plated nickel-phosphorus sputtering target including 10 weight % phosphorus.

FIG. 5 is a bit shift plot of a Co-Ni-Pt alloy magnetic film formed on a nickel-phosphorus underlayer which was sputtered from a sintered $Ni_2P$ target including 20 weight % phosphorus.

FIG. 6a illustrates a signal/noise spectrum of the output signal of a prior art Co-Ni-Pt film disk lacking a nickel-phosphorus sputtered undercoat.

FIG. 6b shows a signal/noise spectrum of the output signal of a Co-Ni-Pt film formed on a nickel-phosphorus sputtered underlayer.

FIG. 7 illustrate the relationship between the amount of bit shift exhibited by a magnetic disk and the thickness of a sputtered nickel-phosphorus alloy underlayer formed from an electroless plated nickel-phosphorus target having 10 weight % phosphorus.

FIG. 8 illustrates the relationship between the amount of bit shift exhibited by a magnetic disk and the thickness of a sputtered $Ni_2P$ underlayer formed from a sintered $Ni_2P$ target.

DETAILED DESCRIPTION

FIG. 1 illustrates in cross section a magnetic disk constructed in accordance with one embodiment of our invention. Referring to FIG. 1, an aluminum substrate 10 is coated with a first nickel-phosphorus alloy layer 11. Nickel-phosphorus layer 11 is typically formed on substrate 10 with an electroless plating process and is formed to a thickness between 10 and 20 microns ($\mu$m). Of importance, nickel-phosphorus layer 11 is mechanically strong, easily textured, and resistant to scratches. Further, nickel-phosphorus layer 11 provides support for subsequently formed magnetic media so that the resulting disk is less likely to sustain damage caused by the impact of a read/write head against the disk surface. The surface of nickel-phosphorus layer 11 is then polished and cleaned in a conventional manner. In addition, the surface of layer 11 is textured to enable the resulting disk to provide an aerodynamic surface texture which will enable the magnetic disk read/write head to "fly" above the surface of the disk.

Thereafter, a second nickel-phosphorus layer 12 is sputtered onto layer 11. In one embodiment, layer 12 is formed to a thickness between 5 and 200 nm. It is desirable to ensure that nickel-phosphorus layer 12 is at least 5 nm thick to ensure that layer 11 is adequately covered. In addition, it is desirable to ensure that layer 12 is less than or equal to 200 nanometers (nm) thick to minimize the rate at which the nickel-phosphorus sputtering target is consumed. It is noted that when sputtering nickel-phosphorus layer 12 onto layer 11, the more nickel-phosphorus is sputtered, the more rapidly nickel-phosphorus alloy is deposited on portions of the sputtering apparatus, and therefore the more often the sputtering apparatus has to be opened up and cleaned. Thus, by forming layer 12 so that it is thin, the frequency of cleaning required for the sputtering apparatus is reduced. The sputtering target used to form layer 12 can be formed by electroless plating of a nickel-phosphorus solution or sintering nickel-phosporus powder.

Immediately after forming layer 12, a layer of Co-Ni-Pt alloy 13 is sputtered onto nickel-phosphorus layer 12, e.g. to a thickness between 30 and 70 nm. In one embodiment, alloy 13 is $Co_{80}Ni_{10}Pt_{10}$. The Co-Ni-Pt alloy serves as the magnetic recording media. In other embodiments of the invention, other magnetic material serves as the recording media, e.g., other cobalt or iron based alloys, such as Co-Pt, Fe-Pt, Co-Re and Co-Cr. Such alloys typically exhibit a high intrinsic coercivity, e.g., between 600 and 2000 Oe so that the media can support a high recording density.

Layer 13 is typically formed on nickel-phosphorus layer 12 immediately after layer 12 is formed on nickel-phosphorus layer 11. Thus, the magnetic disk is typically not removed from the sputtering apparatus between the time nickel-phosphorus layer 12 is formed and the time media layer 13 is formed. Because of this, there is no opportunity for contaminants to lodge on, react with, or otherwise affect the surface of nickel-phosphorus layer 12 prior to the formation of media layer 13. In another embodiment, the disk is removed from the sputtering apparatus between the time layers 12 and 13 are formed, but care is taken to prevent contamination of the surface of nickel-phosphorus layer 12 by placing the disk in a dry protective cassette after layer 12 is formed.

A protective layer such as carbon layer 14 is then sputtered onto media layer 13, e.g., to a thickness between 20 and 30 nm. Layer 14 can also be ceramic material such as sputtered $ZrO_2$ including a stablizier such as $Y_2O_3$. (The stablizer prevents phase transformation of the $ZrO_2$ to the monoclinic phase, thus making the $ZrO_2$ sputtering target and the resulting film less brittle.) Layer 14 is hard and therefore protects the underlying magnetic alloy 13.

It will be appreciated that nickel-phosphorus layer 12 is either amorphous (i.e., non-crystalline) or near amorphous, and therefore masks nonuniformities in the morphology of underlying plated nickel-phosphorus layer 11. Because of this, nickel-phosphorus layer 12 serves as an amorphous uniform nucleation surface for growing sputtered Co-Ni-Pt alloy 13 because there is no crystal structure in layer 12 which alloy 13 tends to emulate. Therefore, magnetic layer 13 exhibits uniform magnetic characteristics. Further, the conditions of the microstructure of crystals in the film which causes formation of the above-described sawtooth-like jagged boundary structures between magnetic cells are minimized.

FIG. 2a illustrates an X-ray diffraction pattern caused by X-rays reflecting off of the surface of a 200 nm thick nickel-phosphorus layer 19 including 10 weight % phosphorus formed on a glass substrate 21 (FIG. 2b). The pattern of FIG. 2a indicates that layer 19 in FIG. 2b is amorphous or near amorphous.

FIG. 2b illustrates the apparatus used to generate the data of FIG. 2a. As can be seen, in FIG. 2b, a 35 KV x-ray source 16 including a copper target provides x-rays 17 which strike and then reflect off of sputtered nickel-phosphorus layer 19. An X-ray sensing device 20 senses the intensity of X-rays. Glass substrate 21 and sensing device 20 are mounted so as to be rotatable with respect to X-ray source 16. As substrate 21 and sensing device 20 are rotated, the intensity of X-rays received by sensing device 20 is measured. FIG. 2a is a graph of the relationship between reflection angle $2\theta$ and the intensity of X-rays at that reflection angle. Angle $2\theta$ is the angle formed between the x-rays which pass through nickel-phosphorus covered substrate 21 and the x-rays which reflect off nickel-phosphorus layer 19 and strike sensing device 20 (e.g. as illustrated in FIG. 2b). If nickel-phosphorus layer 19 was crystalline, then FIG. 2a would indicate the presence of an x-ray diffraction line in the pattern because of Bragg reflection e.g. as described in "Elementary Modern Physics" by Weidner et al., Alternate Second Edition, published by Allyn and Bacon, Inc. in 1974, pages 145 to 149. As can be seen, FIG. 2a is a relatively flat graph, and therefore the structure of nickel-phosphorus layer 19 in FIG. 2b is amorphous or near amorphous. It is believed that a sputtered nickel-phosphorus layer such as layer 12 in FIG. 1 has the same near-amorphous structure as layer 19 in FIGS. 2a and 2b.

As mentioned above, a sputtered nickel-phosphorus layer formed in accordance with our invention reduces the amount of bit shift and decreases the number of bit shift errors. FIG. 3a is a bit shift plot of a typical $Co_{80}Ni_{10}Pt_{10}$ alloy 22 (FIG. 3b) formed directly on a plated nickel-phosphorus layer 23 without the presence of a sputtered nickel-phosphorus undercoat. $Co_{80}Ni_{10}Pt_{10}$ alloy 22 is 60 nm thick and has a coercivity of about 1100 Oe. The disk of FIG. 3b used to generate the data of FIG. 3a includes a sputtered carbon overcoat for mechanical protection. The X axis in FIG. 3a indicates an amount of bit shift in nanoseconds while the Y axis indicates the frequency with which that amount of bit shift is encountered. Thus, for curve 30 of FIG. 3a, 1 bit in $10^9$ bits exhibits a bit shift of at least 15.0 ns while for curve 31, 1 bit in $10^9$ bits exhibits a bit shift of at least about 13.6 ns. The data in curve 30 was generated by recording a repetition of the bit pattern B6D9 (hexidecimal) and reading the pattern back. Curve 31 was generated by writing the bit pattern FFFF (hexidecimal) and reading the pattern back. These patterns were written on track 2400—the innermost track (i.e., at a 1.2" radius) on a 5¼"-diameter disk. The data were written at 6 million bits per second while the disk was rotating at 3600 rpm.

FIG. 4 is a bit shift plot of a $Co_{80}\text{-}Ni_{10}\text{-}Pt_{10}$ alloy magnetic film having a coercivity $H_c$ and a thickness T identical to film 22 of FIG. 3b. However, the film of FIG. 4 is formed on a sputtered nickel-phosphorus undercoat, e.g. as illustrated in FIG. 1. The sputtered nickel-phosphorus undercoat was about 120 nm thick. The sputtering target used to generate the nickel-phosphorus sputtered undercoat was formed by electroless plating of a nickel-phosphorus alloy which includes 10% phosphorus by weight.

Referring to FIG. 4, two curves (curves 32 and 33) were formed by recording a repetition of the bit pattern B6D9 (hexidecimal) and bit pattern FFFF (hexidecimal) respectively. As can be seen, the magnetic disk of FIG. 4 exhibits much less bit shift than the magnetic disk of FIG. 3a. Specifically, one bit in $10^9$ in the disk of FIG. 4 exhibited 12.0 ns of bit shift for both patterns B6D9 and FFFF (hexidecimal) whereas in FIG. 3a, for bit pattern B6D9, one bit in $10^9$ exhibited 14.9 ns of bit shift and for bit pattern FFFF, one bit in $10^9$ bits exhibited 13.6 ns of bit shift. This represents a major improvement in the bit shift characteristics of the magnetic disk.

The data in FIG. 5 was generated from a disk identical to the disk of FIG. 4 except that the sputtered nickel-phosphorus underlayer was formed from sintered $Ni_2P$ (20% phosphorus by weight). As can be seen, for the disk of FIG. 5, when writing bit pattern B6D9 (curve 34), one bit in $10^9$ exhibited approximately 12.0 ns of bit shift and when writing bit pattern FFFF (curve 35), one bit in $10^9$ exhibited a bit shift of about 10.4 ns. It is thus seen that the bit shift exhibited by a disk including a sputtered nickel-phosphorus underlayer, e.g. as illustrated in FIGS. 4 and 5, is less than a disk lacking the sputtered nickel-phosphorus underlayer.

As mentioned above, a magnetic disk constructed in accordance with our invention including a nickel-phosphorus sputtered underlayer exhibits reduced noise. FIGS. 6a and 6b are spectra of an output signal from magnetic disks lacking and including a nickel-phosphorus sputtered undercoat, respectively. In FIGS. 6a and 6b, the x-axis is a linear axis representing a frequency and between 0 Hz and 10 MHz. The spike in FIGS. 6a and 6b represents the signal component while the rest of the spectra represents the noise component of the output signal. The noise content in the signal of FIG. 6a is greater than the noise content of the signal in FIG. 6b as can be seen by comparing the area under the spectra curves of FIGS. 6a and 6b away from the spike indicative of the signal component.

FIG. 7 illustrates the relationship between bit shift and the thickness of a sputtered nickel-phosphorus undercoat. The sputtering target used to form the undercoat in FIG. 7 included 10% phosphorus by weight and was formed by electroless plating. The data graphed in FIG. 7 was selected by measuring the amount of bit shift experienced by one bit in $10^9$ bits for various thicknesses of nickel-phosphorus. FIG. 7 includes a first curve 40 generated by recording bit pattern B6D9 and a second curve 41 generated by recording bit pattern FFFF. As can be seen, the maximum amount of bit shift occurs when the thickness of the sputtered nickel-phosphorus film is 0 (i.e., no nickel-phosphorus film) and decreases gradually as the nickel-phosphorus film thickness reaches 120 nm. For thicknesses greater than 120 nm, further increases in thickness of the NiP layer result in only minimal changes in bit shift.

FIG. 8 is similar to FIG. 7 except that a $Ni_2P$ film was sputtered before formation of a Co-Ni-Pt film. As was the case in FIG. 7, it is seen that the bit shift is at a maximum when the thickness of the $Ni_2P$ film in FIG. 8 is 0 and decreases as the $Ni_2P$ film thickness increases to 40 nm. For $Ni_2P$ films having thicknesses greater than 40 nm, there is almost no further decrease in bit shift as the thickness of the $Ni_2P$ film increases.

In another embodiment of our invention, instead of forming a sputtered underlayer comprising a nickel-phosphorus alloy, other nickel compounds or nickel alloys are used. For example, the sputtering target used to form the underlayer can comprise nickel and at least one other element from groups III B, IV B, V B and VI B of the period table, such as B, Al, Ga, In, C, Si, Ge, Sn, Pb, P, As, Sb, Bi, S, Se, or Te. The resulting sputtered underlayer is amorphous or near amorphous.

While the invention has been described with reference to specific embodiments, those skilled in the art will appreciate that minor changes can be made to form and detail without departing from the spirit and scope of the invention. For example, nickel-phosphorus alloys with varying percentages of nickel and phosphorus can be sputtered onto an underlying substrate. Also, instead of sputtering, other vacuum deposition techniques can be used to form the underlayer, such as evaporation. It will also be appreciated that a nickel-phosphorus alloy can be sputtered on a substrate comprising materials other than nickel-phosphorus electroless plated onto aluminum, e.g., a glass or ceramic substrate or a tape. Accordingly, all such changes come within the scope of the present invention.

We claim:

1. A method for manufacturing a film of magnetic recording media comprising the steps of:
    providing a substrate;
    forming a first layer on said substrate by vacuum deposition, said first layer comprising an alloy comprising nickel and phosphorous; and
    forming a layer of magnetic recording media directly on sadi first layer wherein said first layer serves to reduce the amount of bit shift exhibited by said media.

2. The method of claim 1 wherein the amount of bit shift in 1 bit in $10^9$ bits exhibited by said media is reduced by at least about 1 ns by forming said first layer.

3. The method of claim 1 wherein said alloy comprises about 5 to 30% phosphorus by weight.

4. The method of claim 1 wherein said alloy comprises between about 10 and 20% phosphorous by weight.

5. The method of claim 1 wherein said alloy is formed by sputtering using a target comprising plated nickel-phosphorous.

6. The method of claim 1 wherein said ally is formed by sputtering using a sputtering target, said sputtering target comprising a material selected from the group consisting of $Ni_2P$, $Ni_5P_2$, and $Ni_3P_2$.

7. The method of claim 1 wherein said nickel-phosphorous alloy is formed by sputtering.

8. The method of claim 7 wherein said step of forming a layer of magnetic recording media comprises the step of sputtering said layer of magnetic recording media.

9. The method of claim 1 wherein said alloy is formed by sputtering using a nickel phosphorous sputtering target, said target comprising an admixture of a plurality of materials, at least one of said materials being selected from the group of compounds consisting of $Ni_2P$, $Ni_5P_2$ and $Ni_3P_2$.

10. The method of claim 9 wherein each material within said plurality of materials is selected such that said target comprises between about 5 and 30% phsophorous by weight.

11. The method of claim 9 wherein each material within said plurality of materials is selected such that said target comprises between about 10 and 20% phosphorous by weight.

12. A structure comprising:
a substrate;
a first layer formed on said substrate by vacuum deposition, said first layer comprising an alloy comprising nickel and phosphorus; and
a magnetic recording medial formed directly on said first layer;
wherein said first layer serves to reduce the amount of bit shift exhibited by said media.

13. The structure of claim 12 wherein said first layer is formed by sputtering.

14. The structure of claim 12 further comprising a protective overcoat over said media.

15. The structure of claim 12 wherein said media exhibits at least about 1 ns less bit shift with said first layer present than if said first layer was not present.

16. The structure of claim 15 further comprising a protective overcoat over said media.

17. The structure of claim 12 further comprising a support layer formed between said substrate and said first layer.

18. The structure of claim 17 wherein said support layer is a plated nickel-phosphorous layer.

19. A method for manufacturing a film of magnetic recording media comprising the steps of:
providing a substrate;
forming a first layer on said substrate by sputtering, said first layer comprising an alloy comprising nickel and phosphorous; and
forming a layer of magnetic recording media directly on said first layer.

20. The method of claim 19 wherein said media comprises an alloy having an intrinsic coercivity greater than about 600 Oe.

21. The method of claim 19 wherein said media is an alloy comprising cobalt and platinum.

22. The method of claim 19 wherein said subtrate comprises a material selected from the group consisting of glas, ceramic, aluminum, and nickel-phosphorous plated aluminum.

23. The method of claim 19 wherein said substrate is tape.

24. The method of claim 19 further comprising the step of forming a protective overcoat over said media.

25. The method of claim 24 wherein said protective overcoat is a material selected from the group consisting of sputtered carbon, $ZrO_2$, $SiO_2$, $TiO_2$, and TaO.

26. The method of claim 19 further comprising the step of plating a support layer onto said substrate prior to forming said first layer.

27. The method of claim 26 wherein said support layer comprises a nickel-phosphorus alloy.

* * * * *